June 18, 1968     P. A. ROTENBURGER     3,388,482
AIRFLOW CONTROL SYSTEM FOR GRAIN DRYING
Filed May 18, 1966
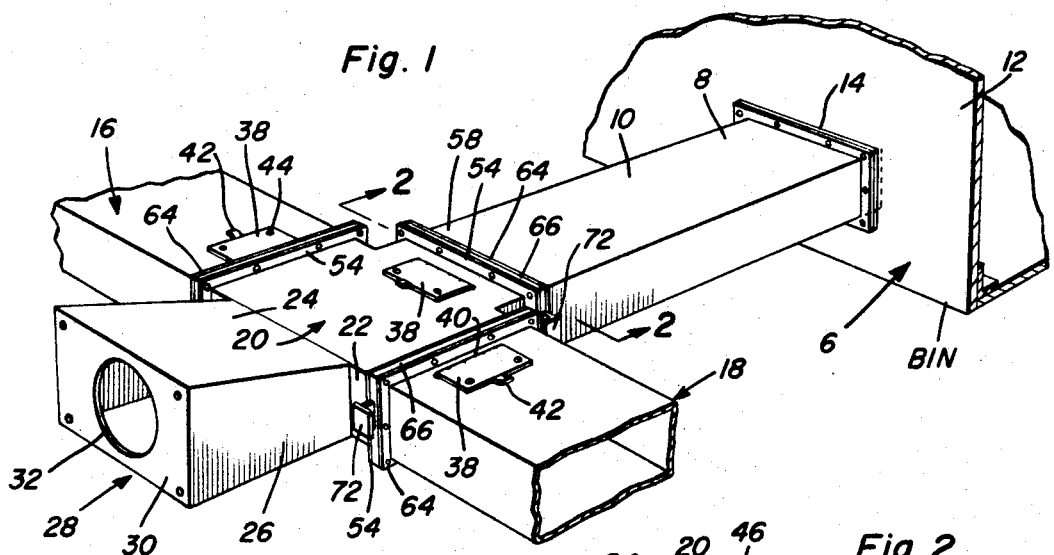
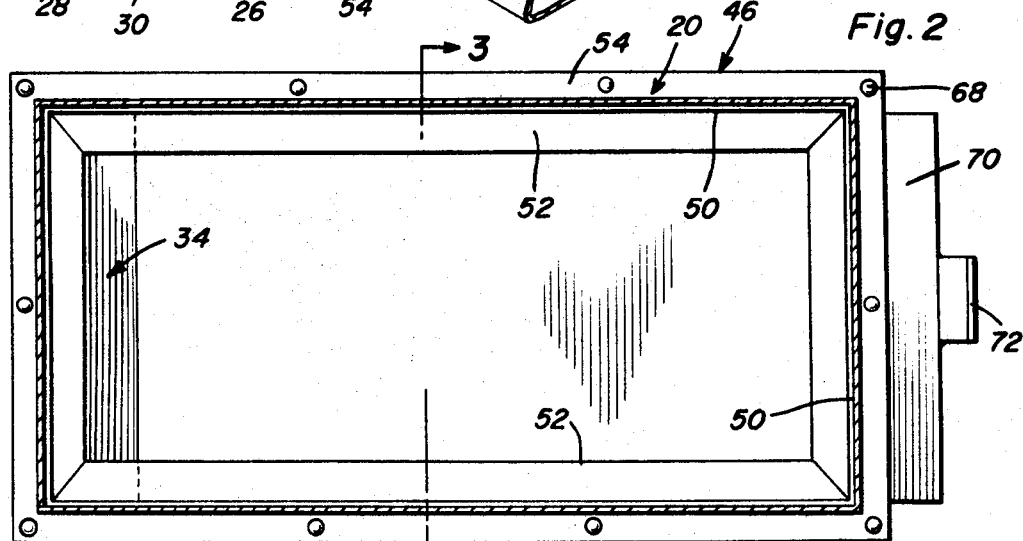
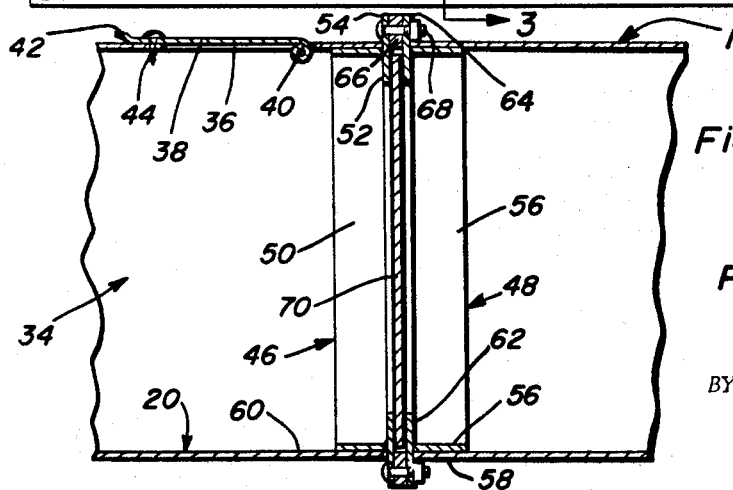
Peter A. Rotenburger
INVENTOR.

United States Patent Office 3,388,482
Patented June 18, 1968

3,388,482
AIRFLOW CONTROL SYSTEM FOR
GRAIN DRYING
Peter A. Rotenburger, R.R. 4, Box 63, Hilltop Trailer
Court, Iowa City, Iowa 52240
Filed May 18, 1966, Ser. No. 550,974
5 Claims. (Cl. 34—210)

ABSTRACT OF THE DISCLOSURE

The grain drying means disclosed comprehends a box-like duct assembling and uniting header providing an airtight distributing chamber. A coplanar inlet unit is rigidly communicatively connected wtih a marginal wall of the header. This unit is funnel-like in construction and has an apertured wall to accommodate an applicable and removable centrifugal blower fan. At least one duct (usually several ducts) has an air intake end rigidly communicatively joined by airtight connecting means to the header. The discharge end of the duct is communicatively joined to a coplanar stationary bin. Manually regulable valving means is provided to control the flow of drying air through the duct from the header to the bin.

---

This invention relates to crop drying apparatus and systems and, generally stated, to an orderly combination and arrangement of component parts which are uniquely constructed and oriented to provide a controllable air circulating structure, more particularly, a system of coordinating ducts which have the capability of selectively delivering heated air under pressure to one or more individual bins with corn, beans or the like stored therein.

Modern farming equipment and systematized procedures account for significantly increased production of corn, beans, grains and the like. It follows that there has long existed a need for time and labor saving means through the medium of which grain stored in individual bins can be expeditiously subjected to efficient drying. Corn, for example, has to be kept at a prescribed moisture content while in storage to guard against spoilage. Accordingly, an object in the instant matter is to provide farmers with a simple, practical and readily usable apparatus (a novel system of communicating ducts) which, considered as a whole, provides an over-all structural apparatus for selectively controlling the supply and flow of drying air from a single source via valved ducts and properly delivering the same to stationary bins singly or collectively, as the case may be. The thus constructed and performing forced air system functions to dry the contents of several associated bins in a manner to prevent spoilage and overcomes the difficulties encountered when as, for example, the grain is subjected to unsatisfactory handling and drying in mobile trucks and wagons in the field preparatory to subsequent storage in stationary bins. Then, too, the systematized adaptation herein revealed obviates the necessity of having to employ portable forced air blowers.

The invention herein disclosed offers the farmer a feasible and efficient apparatus which well serves its intended purposes when needed for reliable drying of large quantities of corn or beans, as the case may be. It functions to achieve maximum drying results, saves valuable time and labor and reduces spoilage to a practical minimum. The consolidated arrangement of valved ducts communicatively joined to a hub-like junction box or header provides an ideal assemblage for flow-controlled installation and use between a stationary source of heated pressurized air and the relatively fixed crop-laden bins.

Briefly, the apparatus relies for novelty on manually regulatable and controllable heated air confining and circulating means. This means is characterized by a plurality of correspondingly constructed coplanar air tunneling and delivering ducts whose discharge ends are cooperatively connectible with their respectively coacting storage bins. The opposite air intake ends of the ducts are united by flow controlled valving means to marginal portions of a hollow hub-like junction box which provides an air trapping and supplying header. This header provides a nucleus for the system of coordinating ducts and has a funnel-like air inlet unit at one marginal side to accommodate a suitable air heating and blower fan or equivalent means which generates and force-feeds the air through said inlet unit into the chamber of the junction box or header.

Novelty is herein predicated on the hub-like hollow heater or junction box with selectively usable coplanar ducts branching laterally from the open marginal portions of the header and wherein specially constructed valving means is located at the juncture of each duct and registering portion of said junction box. To the ends desired each valving means comprises first and second frames which are alike, opposed in alignment and are T-shaped in cross-section whereby to thus provide collar-like frame positioning and mounting flanges. The collar-like flange on the first frame telescopes into and is fixed in place within the confines of the air trapping chamber thus providing interior and exterior assembling flanges. The collar-like flange on the second companion frame telescopes into and is fixed in place in the coacting terminal intake end of the cooperating air conveying duct and likewise provides said duct with interior and exterior duct assembling flanges. The exterior flanges are properly lined up and spacing members are sandwiched and bolted in place therebetween. By thus aligning and securing the frames in face-to-face relationship the respective interior flanges provide channel-like guides in which the valve—a simple hand grip equipped flat plate—is slidingly pocketed and thus operatively keyed in its intended controllable position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing several oriented ducts with one duct cooperatively joined with a fragmentary portion of a complemental grain bin, with two additional ducts broken away and with the air intake adaptor unit at the left with which a conventional type air heating and blower fan or equivalent device (not shown) is operatively connected.

FIG. 2 is an enlarged section taken approximately on the plane of the section line 2—2 of FIG. 1 looking in the direction of the arrows.

FIGURE 3 is a fragmentary section at right angles to FIG. 1 taken on the plane of the vertical section line 3—3 of FIG. 2.

By way of introduction to the description to the details it will be evident that the concept has to do with an apparatus or system which is expressly designed to dry grain and is essentially made up of a system of ducts coordinated in a manner to control the movement of air to a selected bin in which the drying operation is desired. The invention is advantageous in that one dryer may be used to dry several bins. Broadly or basically, the system or apparatus involves a plurality of coordinating air controlled ducts. The air from the dryer enters the chamber of the junction box or header and can be delivered or distributed into one bin or into two bins in any amount desired. In practice by using another junction box or chamber more bins can be dried. The amount of air being circulated is controlled by the slidable valve plates.

It is to be further pointed out, also by way of introduction, that the assemblage of ducts is not controlled by the illustration thereof in FIG. 1. This figure, however, serves to save space, has been prepared to show an arrangement wherein a single bin (for corn, beans or grain) is denoted at the right and is designated by the numeral 6. This bin is stationary and of any suitable conventional construction. The discharge end portion 8 of the cooperating air conveying duct 10 is suitably operatively connected to an aperture in a side wall 12 as denoted generally at 14. This duct 10 has basically the same construction as the additional left and right ducts 16 and 18 shown in FIG. 1. The corresponding air intake ends of these ducts are communicatively connected with open marginal side portions of a duct orienting and assembling component part which is here referred to as a housing and also as a hollow header or junction box and is denoted generally by the numeral 20. The hollow portion of the junction box provides an accumulating and trapping chamber for the heated crop drying air. One side wall as at 22 in FIG. 1 is utilized to provide a partial support for the converging ends of the walls 24 and 26 of a funnel-like adaptor unit 28. The left hand wall 30 of this unit is provided with an opening 32 to accommodate a neck or equivalent component part on the casing of a centrifugal fan or equivalent air heating and pressurizing dryer. Inasmuch as the dryer will vary in construction and may be said to be of a conventional type, it is not herein shown. In any event, the pressurized heated air from the dryer (not shown) is passed through the funnel-like adaptor and into the chamber portion 34 of the junction box or header 20. This header is provided with marginal sides or walls which serve to accommodate the attached valved air intake ends of the aforementioned selectively usable and controllable ducts 10, 16 and 18. Incidentally, the discharge ends of the ducts 16 and 18 are in practice connected with individual grain storing bins (not shown) in the manner illustrated at the right in FIG. 1. It will be further observed that the header 20, the attached adaptor unit 28 and the several complemental ducts 10, 16 and 18 are assembled to provide a simplified apparatus or system of the type illustrated in FIG. 1. The top walls of the ducts, for example the ducts 16 and 18, are provided with cleanout holes or openings of the type illustrated at 36 in FIG. 3. Each cleanout opening is provided with a lid, door, or cover 38 hingedly mounted as at 40, provided with a finger piece 42 conveniently arranged for usage and provided with simple screws or the like as at 44 to secure the lid or cover 38 in the closed position shown in FIG. 3. These cleanout openings and covers will be provided wherever necessary or desired and are here shown in associated relationship in FIG. 1.

As already stressed the valving means and accordingly the manner in which the ends of the ducts adjacent the header 20 are mounted is highly significant and important. Inasmuch as the means for positioning and securing the ducts to the intended marginal sides of the header is the same for each duct like numerals will be used to designate like parts throughout the views. The means now under advisement is shown in FIGS. 2 and 3. With reference first to FIG. 3 the numeral 46 designates a first frame and the numeral 48 designates a second complemental or companion frame. Both of these frames are generally rectangular in outline and are preferably made of 20-gauge steel. Moreover each frame 46 or 48 as the case may be is T-shaped in cross-section. One flange of the T-iron is differentiated by the numeral 50 and may be described as a locating or positioning collar. It is fitted telescopingly into the interior or hollow portion of the junction box as shown at the left in FIG. 3 and provides a complemental interior flange 52 and an exterior flange 54. The T-iron 48, which is also a unitary rectangular frame, provides a corresponding laterally disposed positioning collar-like flange 56 which is telescopingly fitted and suitably secured in the end portion 58 of the duct 10, as distinguished from the end portion 60 of the junction box 20. In this adaptation the interior flange which projects into the passageway of the duct is denoted at 62 and the exterior flange at 64. The outwardly projecting flanges 54 and 64 serve to accommodate a spacer frame 66 which is interposed or sandwiched in place and bolted as at 68. The frame spaced flanges 54 and 64 serve to space the inwardly projecting or interior flanges 52 and 62 which latter flanges cooperate with each other in defining a channel-like receiver or pocket for a slidingly mounted flat-faced plate 70 which constitutes and provides a valve which spans a passage in which it is located. One end portion of this valving plate is provided with a suitable finger grip 72 which is accessible and which allows the desired opening and closing or valving steps to be satisfactorily attained.

These T-iron frames 46 and 48 have been found to be ideal in that they are fittingly applicable to the component parts with which they cooperate, and they in turn cooperate with each other in providing the alignment and assembling of the parts which have proved out to be so acceptably efficient. This construction and arrangement has proved out to achieve the air tight seal so necessary in an apparatus of the type under consideration. The ductwork can be of any length or width, its only limitation on length being the strength of the dryer motor (not shown). Any standard dryer motor may be used with this system.

It is submitted that a careful consideration of the views of the accompanying drawing with the specification will enable the reader to obtain a clear and comprehensive understanding of the construction of the parts, their association and united cooperation and the features and advantages which have heretofore been set forth. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Manually controllable heated air circulating crop drying means comprising, in combination, at least one stationary storing and drying bin for grain or the like, a hollow box-like housing providing a duct assembling and uniting header, the hollow portion of said header providing an airtight trapping and distributing chamber for a supply of heated crop drying air, said housing embodying top, bottom and marginal side walls, at least one collar-like frame positioning and mounting flange telescoping and fixedly mounted in said header in alignment with a cooperating marginal side wall, a second frame aligned with and opposed to said first frame and having a collar-like positioning and mounting flange, a first duct having an intake end into which said last-named mounting flange is telescopingly fitted and secured in place, a spacing member interposed between and associatively cooperable with marginal portions of said first and second frames and securing said frames together in airtight relationship, a valve plate slidingly and guidingly mounted between cooperating component portions of said first and second frames, said duct having a discharge end cooperatively and communicatively connected with said bin, said duct being of rigid material, a diametrically opposite marginal side of said header being provided with a hollow outstanding funnel-like adapter unit communicating with the chamber of said header and having an accessible wall with an opening therein for the attachment thereto of a heat generating centrifugal fan.

2. The structure defined in and according to claim 1 and, in combination, additional air delivering and distributing ducts having adjacent air intake ends communicatively and operatively attached to coacting marginal portions of said header by way of flanged airtight duct assembling and mounting collars.

3. The structure according to claim 1, and wherein said frames are T-shaped in cross-section whereby to provide, in addition to said collar-like mounting flanges, interior and exterior flanges, said spacing members being sandwiched and secured between the exterior flanges, the interior flanges being opposed in spaced parallel relation and defining and providing channel-like guides, and said plate valve being slidingly pocketed and marginally keyed and held in place in the respectively cooperating guides, said plate valve normally spanning the passageway of said duct and being provided with an exteriorly located finger grip which is accessible for use in opening and closing said plate and consequently said passageway.

4. The structure according to claim 3, and wherein said duct has a top wall provided with a cleanout opening, and a hingedly accessibly mounted door normally covering and closing said opening.

5. Manually controllable heated air circulating and crop drying means comprising, in combination, a hollow box-like housing providing a duct asembling and uniting header, the hollow portion of said header constituting an airtight trapping and distributing chamber for heated crop drying air, an inlet unit coplanar with and communicatively connected wtih a contiguous marginal wall of said header, said inlet unit comprising a hollow funnel-like member having an apertured wall whose aperture is readily accessible and adapted to accommodate an air heating and blower fan, a first heated air conveying duct having an air intake end rigidly communicatively joined by airtight connecting means to the chamber of said header, a relatively stationary grain storing and drying bin having a heated air intake opening, the discharge end of said duct being operatively communicatively joined to said bin through the medium of said intake opening, a second heated air directing and conveying duct likewise having an intake end communicatively joined to a coacting marginal side of said header and a discharge end adapted to be communicatively joined to a second crop storing and drying bin, said inlet being mounted on a marginal side of said header in addition to and separate from the aforementioned marginal sides of said header whereby a single header functions to orient and cooperatively and communicatively coordinate said inlet unit and said first and second named ducts, manually regulatable valving means adapted to control the flow of drying air from said distributing chamber through the respective ducts to the aforementioned bins, each valving means comprising a first frame having a collar-like frame positioning and mounting flange telescoping into and fixed in said header, a second frame aligned with and opposed to said first frame and likewise having a collar-like positioning and mounting flange telescoping into and fixed in the coacting intake end portion of the associated duct, a spacing member interposed between associatively cooperable marginal portions of said first and second frames and securing said frames together in airtight relationship, and a valve plate slidingly and guidingly mounted between coacting component portions of said first and second frames.

References Cited

UNITED STATES PATENTS

| | | | |
|---|---|---|---|
| 1,161,997 | 11/1915 | Thompson | 251—238 XR |
| 1,580,767 | 4/1926 | Skromme | 34—214 XR |
| 1,999,921 | 4/1935 | Burkhardt | 251—328 XR |
| 2,661,544 | 12/1953 | Tanasse | 34—214 XR |
| 2,714,258 | 8/1955 | Smith et al. | 34—214 |
| 2,722,058 | 11/1955 | Heal | 98—55 |

FREDERICK L. MATTESON, JR., *Primary Examiner.*

H. B. RAMEY, *Assistant Examiner.*